US006962482B2

(12) United States Patent
Tanaka

(10) Patent No.: US 6,962,482 B2
(45) Date of Patent: Nov. 8, 2005

(54) TURBINE SHROUD SEGMENT

(75) Inventor: Agamu Tanaka, Tokyo (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 8 days.

(21) Appl. No.: 10/743,011

(22) Filed: Dec. 23, 2003

(65) Prior Publication Data
US 2005/0002780 A1    Jan. 6, 2005

(30) Foreign Application Priority Data
Jul. 4, 2003    (JP)    ............................... 2003-271199

(51) Int. Cl.[7] ........................................... F01D 11/12
(52) U.S. Cl. ............................... 415/173.1; 415/173.4; 415/173.5; 415/173.6; 277/414; 277/415; 277/416; 277/421
(58) Field of Search ..................... 415/173.1, 173.3, 415/173.4, 173.5, 173.6, 176–178; 277/411–412, 277/414–416, 421

(56) References Cited

U.S. PATENT DOCUMENTS

| 3,603,599 A | * | 9/1971 | Laird ......................... 277/414 |
| 3,986,720 A | * | 10/1976 | Knudsen et al. ............. 277/411 |
| 5,044,881 A | * | 9/1991 | Dodd et al. ............... 415/173.3 |
| 5,201,846 A | * | 4/1993 | Sweeney .................. 415/173.6 |
| 5,281,089 A | * | 1/1994 | Brown et al. ............. 415/173.1 |
| 6,350,102 B1 | | 2/2002 | Bailey et al. |

FOREIGN PATENT DOCUMENTS

| EP | 1 132 576 | 9/2001 |
| GB | 722 740 | 1/1955 |
| GB | 1 052 324 | 12/1966 |
| JP | 9-329003 | 12/1997 |
| JP | 11-62509 | 3/1999 |

* cited by examiner

Primary Examiner—Christopher Verdier
(74) Attorney, Agent, or Firm—Oblon, Spivak, McClelland, Maier & Neustadt, P.C.

(57) ABSTRACT

A shroud segment for being incorporated in a gas turbine engine having a turbine case and a rear turbine case connected with a rear end of the turbine case so as to suppress influence of hot combustion gas on the turbine case and the rear turbine case, is provided with a back plate formed in an arc shape and supported by the turbine case, a touching member integrally formed on an inner surface of the back plate for touching with a rotating turbine blade; and a jet shield extended from a rear end of the back plate and slanted radially inward so as to shield the rear turbine case from a jet of the hot combustion gas.

11 Claims, 5 Drawing Sheets

US 6,962,482 B2

TURBINE SHROUD SEGMENT

BACKGROUND OF THE INVENTION

1. Field of the Invention

The present invention relates to a gas turbine engine for an aircraft and such and more particularly relates to a shroud segment of a turbine shroud for the gas turbine engine.

2. Description of the Related Art

A turbine of a gas turbine engine for an aircraft and such is provided with plural stages of turbine shrouds for suppressing influence of hot combustion gas on a turbine case. The turbine shrouds are directly exposed to the hot gas and thereby a severe thermal stress might be applied thereto. To avoid an excessive thermal stress, in common, each turbine shroud is segmented. Plural shroud segments are built up to form each turbine shroud.

Each shroud segment is provided with a back plate, as a main body thereof, formed in an arc shape. An outer surface of the back plate is supported by the turbine case. An inner surface of the back plate is integrally provided with a touching member for touching with rotating turbine blades, which is formed in a honeycomb shape or the like.

The turbine case in the vicinity of the turbine shroud of the last stage might be exposed to collision of the hot gas having high energy. This might lead to local and severe elevation of temperature and cause strength reduction of the turbine case. To avoid this phenomenon, the turbine is further provided with a jet cover at a rear side of the turbine shroud of the last stage.

The jet cover in place of the turbine case is exposed to the hot gas jet so that the local elevation of temperature of the turbine case is prevented. The shroud segments further prevents the turbine case from being influenced by the hot gas.

A related art is discloses in Japanese Patent Application Laid-open No. H11-62509.

SUMMARY OF THE INVENTION

The jet cover effectively prevents the temperature elevation of the turbine case. However, providing the jet cover causes increase of weight and structure complexity of the turbine engine. Furthermore, the rear side of the turbine shroud of the last stage has a complex structure so that installation of the jet cover needs elaborated working.

The present invention is achieved in view of solving the above problem and intended for providing a shroud segment which effectively suppresses the local temperature elevation of the turbine case by the hot gas jet without the jet cover.

According to an aspect of the present invention, a shroud segment for being incorporated in a gas turbine engine having a turbine case and a rear turbine case connected with a rear end of the turbine case so as to suppress influence of hot combustion gas on the turbine case and the rear turbine case, is provided with a back plate formed in an arc shape and supported by the turbine case, a touching member integrally formed on an inner surface of the back plate for touching with a rotating turbine blade; and a jet shield extended from a rear end of the back plate and slanted radially inward so as to shield the rear turbine case from a jet of the hot combustion gas.

More preferably, the jet shield is integrally formed on the rear end of the back plate.

More preferably, the touching member is integrally provided with a rear touching member disposed in a rear part of the touching member and projected radially inward from the touching member. Further more preferably, the touching member and the jet shield are configured so as to satisfy an iequality of $0.25\,m \leq k \leq 0.42\,m$, where m is a radial projection length of the jet shield from the rear touching member and k is a radial projection length of the rear touching member from the touching member.

More preferably, the shroud segment is further provided with a front leaf spring and a rear leaf spring attached on an outer surface of the shroud segment so as to be respectively insertable into grooves provided for the turbine case.

DETAILED DESCRIPTION OF THE PREFERRED EMBODIMENT

An embodiment of the present invention will be described hereinafter with reference to FIGS. 1 through 5. Throughout the specification, definition of directions such as front and rear is consistent with directions of elements in practical use. For example, a front end is illustrated on left hand in FIGS. 1 and 5. In and out are defined by near and far from an axis of a turbine engine.

Figure 5:
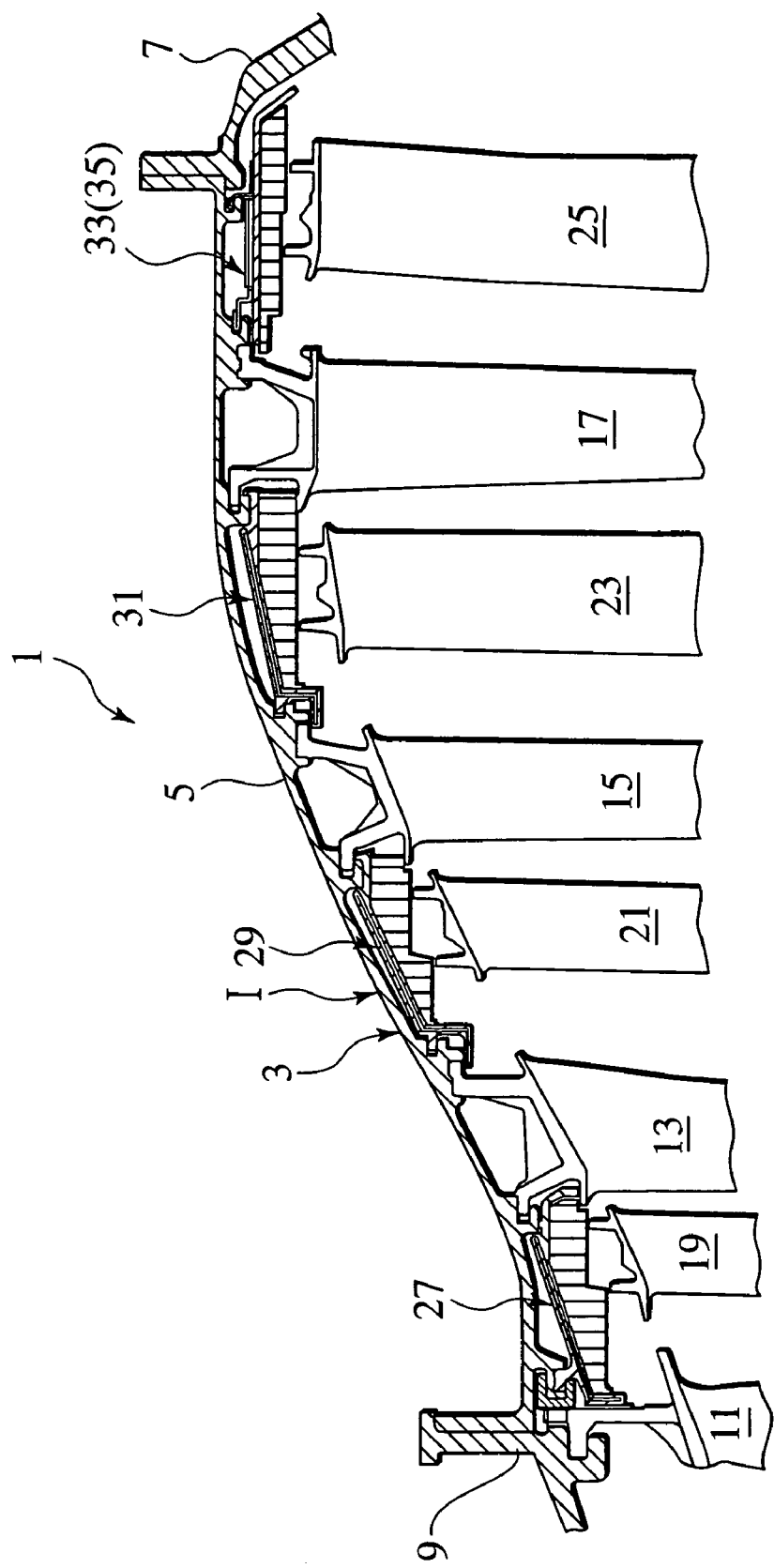
FIG. 5 is a sectional view of a low-pressure turbine for an aircraft, to which the shroud segment is installed.

Referring is now made to FIG. 5. A low-pressure turbine 1 of a turbine engine for an aircraft is provided with a turbine case 3. The turbine case 3 is provided with a main turbine case 5 and a rear turbine case 7 integrally connected with a rear end of the turbine case 5. A front end of the main turbine case 5 is connected with a high-pressure turbine case 9.

A plurality of turbine nozzles 13, 15 and 17 for rectifying the hot gas are fixed to and housed in the main turbine case 5. Each of the turbine nozzles 13, 15 and 17 is segmented to be plural nozzle segments which are butted end to end to form a complete ring. A plurality of turbine rotors are disposed alternately with the turbine nozzles 13, 15 and 17 and respectively provided with turbine blades 19, 21, 23 and 25. The turbine rotors unitedly rotate and are connected to a rotor of a low-pressure compressor (not shown) and a fan rotor of a fan (not shown). Turbine shrouds 27, 29, 31 and 33 are respectively disposed around the turbine rotors. Each of the turbine shrouds 27, 29, 31 and 33 is segmented to be plural shroud segments which are butted end to end to form a complete ring.

The hot gas having energy is supplied from a combustor (not shown) to the low-pressure turbine 1 so as to rotate the turbine rotors to which the low-pressure compressor and the fan are connected. Thereby the low-pressure turbine 1 extracts the energy from the hot gas and converts it to power to drive the low-pressure compressor and the fan.

Shroud segments 35 shown in FIGS. 1 through 4 are segmented from the turbine shroud 33, which is disposed at a last stage of the low-pressure turbine 1. Each shroud segment 35 is provided with a back plate 37 formed in an arc shape. A front leaf spring 41 is attached on an outer surface of the back plate 37 and slidably fitted to a front groove 39 provided for the main turbine case 5. On the outer surface of the back plate 37, a rear leaf spring 45 is further attached in the rear of the front leaf spring 41. The rear leaf spring 45 is slidably fitted to a rear groove 43 provided for the main turbine case 5.

The back plate 37 is supported by both the front leaf spring 41 inserted into the front groove 39 and the rear leaf spring 45 inserted into the rear groove 43. A front end of the back plate 37 is configured so as to support an outer band 47 of the turbine nozzle 17 disposed in front of and adjacent to the shroud segment 35.

Figure 3:
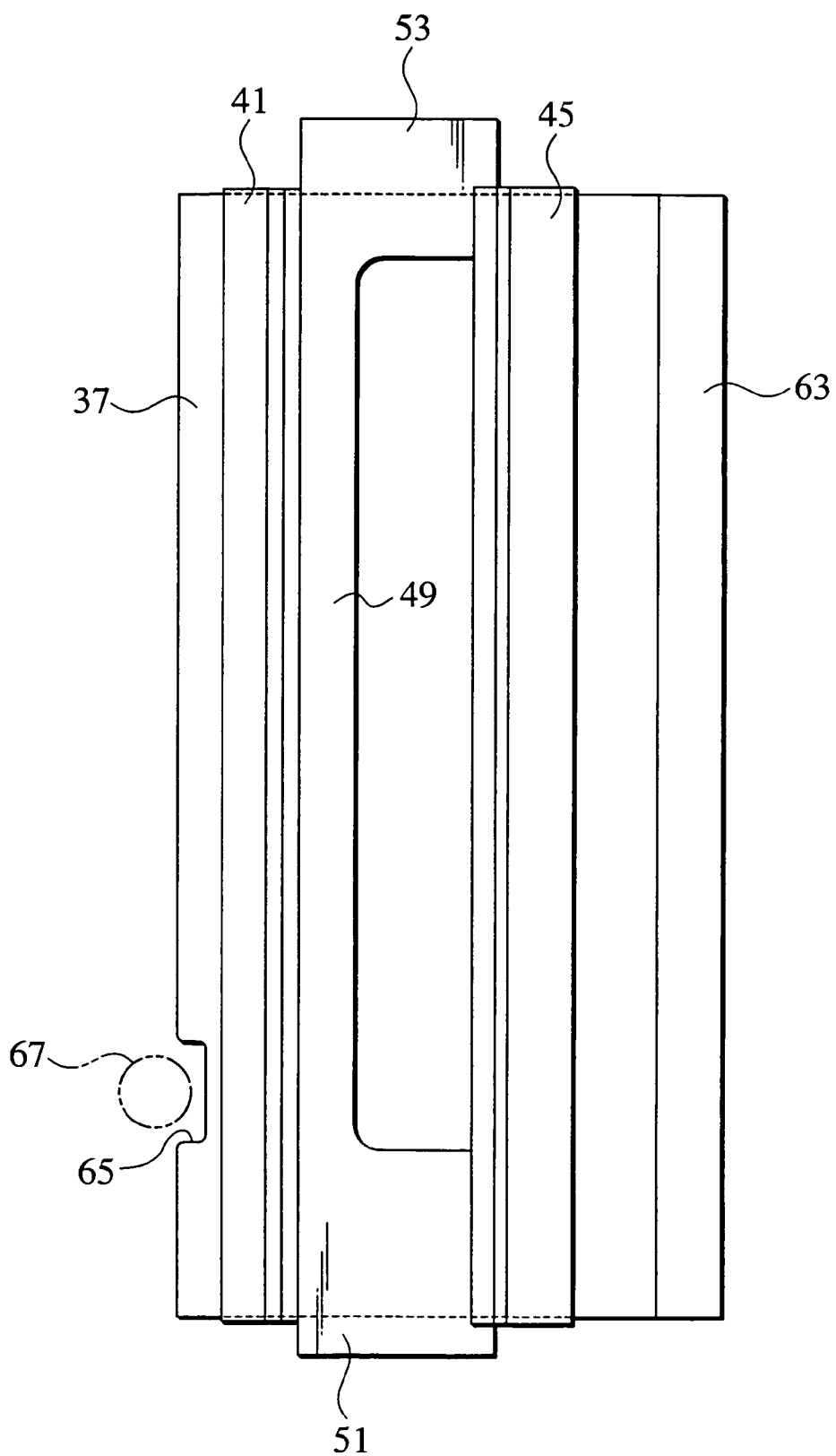
FIG. 3 is a plan view of the shroud segment.
Figure 4:
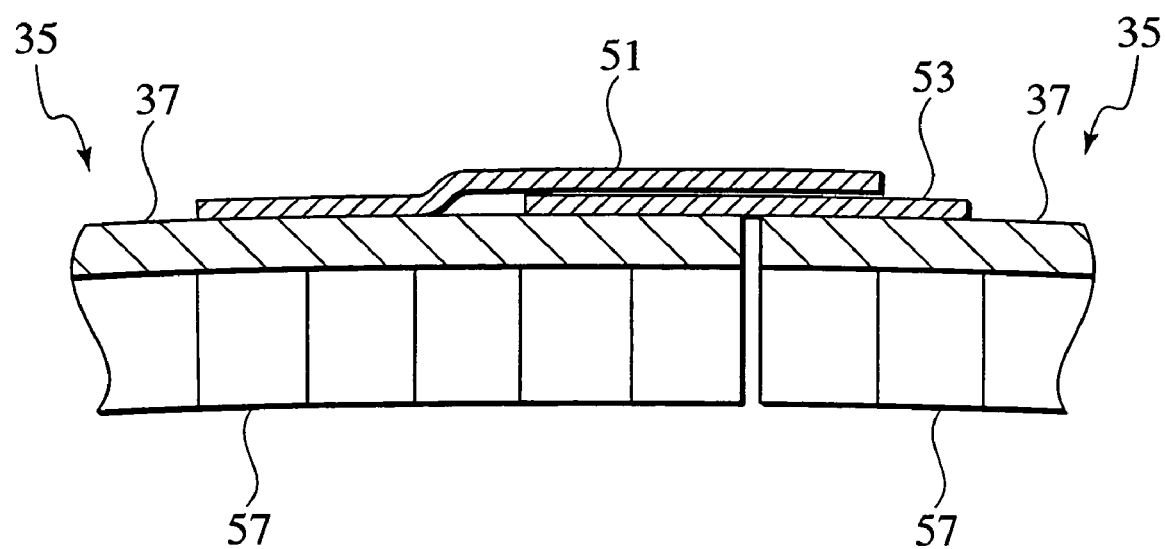
FIG. 4 is an enlarged front view showing butting state between two of the shroud segments.

On the outer surface of the back plate 37, a connection plate 49 extending in a width direction thereof is provided. Both ends of the connection plate 49 are projected from the back plate 49 so as to form a first connection piece 51 and a second connection piece 53 respectively as shown in FIG. 3. The first connection piece 51 and the second connection piece 53 are formed in complementary shapes so that the first connection piece 51 is engaged with and support a second connection piece 53 of an adjacent back plate 37 as shown in FIG. 4.

An inner surface of the back plate 37 is integrally provided with a honeycomb cell 57 for touching with tip fins 55 of rotating turbine blades 25. A front end of the honeycomb cell 57 is provided with a step portion 57a. A rear end of the honeycomb cell 57 is integrally provided with a rear honeycomb cell 61. The rear honeycomb cell 61 is slightly projected radially inward from the honeycomb cell 57.

The rear end portion of the back plate 37 is further extended and slanted radially inward so as to form a jet shield 63 for shielding the rear turbine case 7 from a combustion gas jet J which passes through a clearance between the rear honeycomb cell 61 and the rear tip fins 59.

Figure 1:
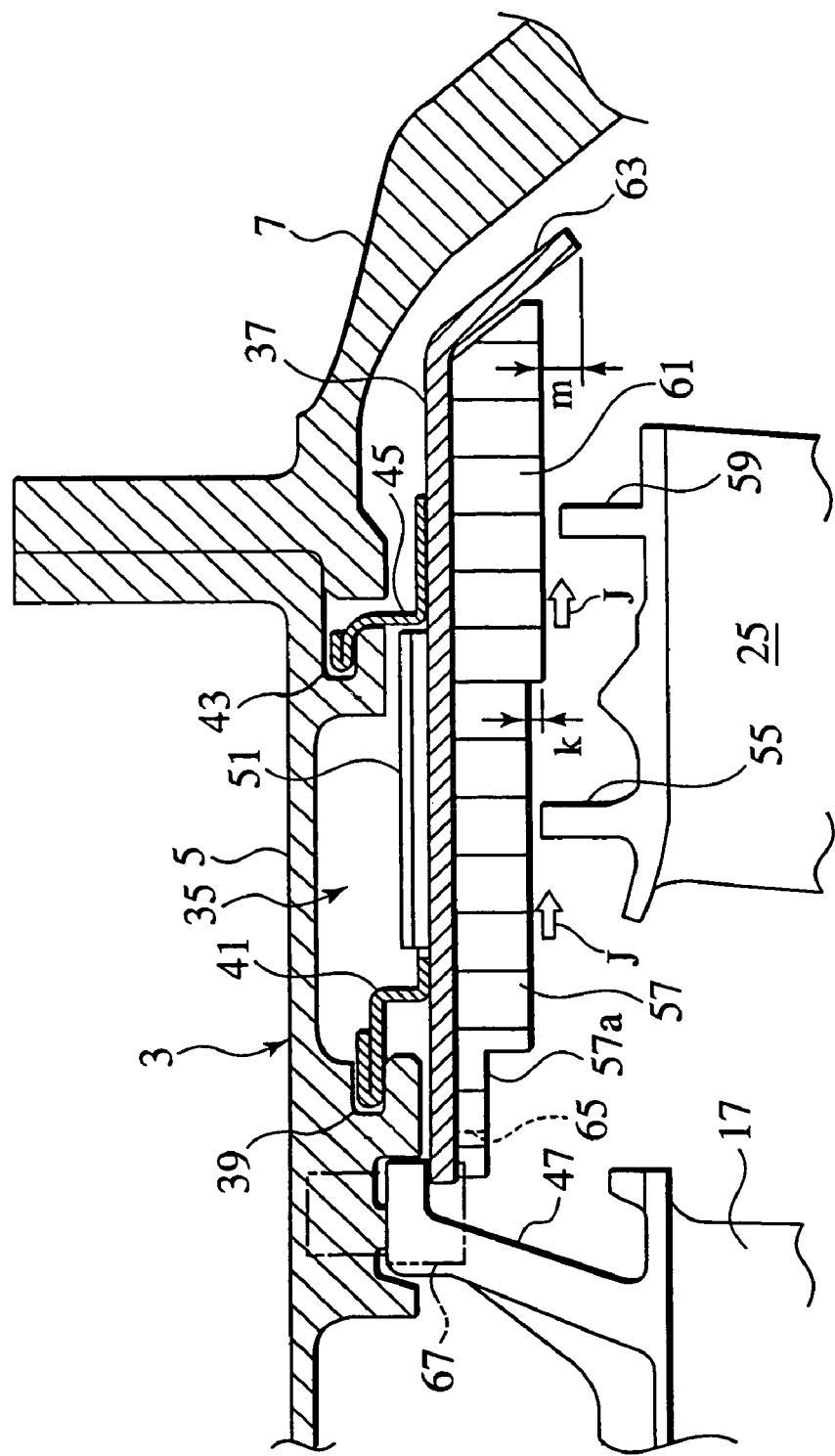
FIG. 1 is a sectional view of a shroud segment according to an embodiment of the present invention, taken from an arrow I of FIG. 5.

The front honeycomb cell 57, the rear honeycomb cell 61 and the jet shield 63 are configured so as to satisfy a particular relation described below. To effectively weaken the gas jet flow, the projection of the rear honeycomb cell 61 should be longer in a relation with the jet shield 63. Preferably an inequality of 0.25 m$\leq$k should be satisfied, where m is a radial projection length of the jet shield 63 from the rear honeycomb cell 61 and k is a radial projection length of the rear honeycomb cell 61 from the front honeycomb cell 57 as shown in FIG. 1. To avoid providing an excessively long projection, the radial projection length k should be smaller. Preferably an inequality of k$\leq$0.42 m should be satisfied. Therefore, the front honeycomb cell 57, the rear honeycomb cell 61 and the jet shield 63 are configured so as to satisfy an iequality of 0.25 m$\leq$k$\leq$0.42 m.

Figure 2:
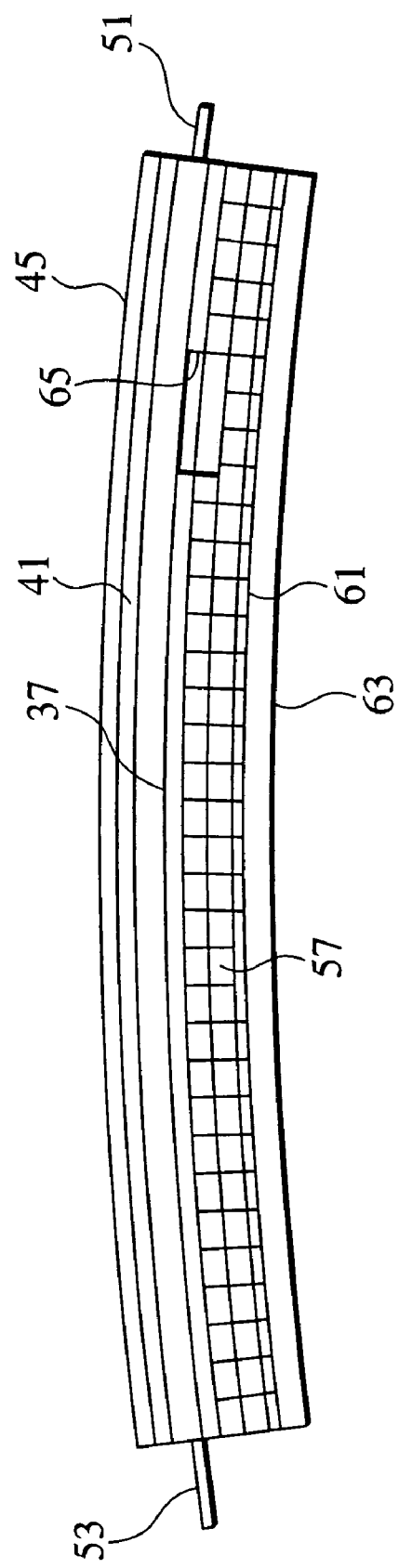
FIG. 2 is a front view of the shroud segment.

The front end of the segment flange 45 is provided with a recess 65 as shown in FIGS. 1 through 3, with which pins 67 fixed to the main turbine case 5 is engaged so that relative rotation thereof is pinned.

Working and effects of the shroud segment 35 according to the present embodiment will be described hereinafter.

The jet shield 63 receives the combustion gas jet J. Thereby the shroud segment 35 with the jet shield 63, instead of the jet cover of prior arts, prevents the rear turbine case 7 from being directly exposed to the combustion gas jet J and local heated thereby.

The rear honeycomb cell 61 projected from the front honeycomb cell 57 weakens the combustion gas jet J flowing through a clearance between the honeycomb cell 57 and the rear tip fins 59. As mentioned above, the front honeycomb cell 57, the rear honeycomb cell 61 and the jet shield 63 are configured so as to satisfy an inequality of 0.25m$\leq$k$\leq$0.42 m, where m is a radial projection length of the jet shield 63 from the rear honeycomb cell 61 and k is a radial projection length of the rear honeycomb cell 61 from the front honeycomb cell 57. Thereby the combustion gas jet J is effectively weakened before colliding with the jet shield 63 though the rear honeycomb cell 61 is prevented from an excessive load.

The jet shield 63 is integrally formed with the rear end of the back plate 37, thereby the jet shield 63 is prevented from detachment and displacement.

In addition to the aforementioned function, in which the local temperature elevation of the rear turbine case 7 is prevented, the plurality of the shroud segments 35, which form the turbine shroud 27, shield the low-pressure turbine case 3 from the hot combustion gas, thereby the low-pressure turbine case 3 is prevented from excessive temperature elevation.

The aforementioned functions can be achieved without additional members. Weight saving of the low-pressure turbine 1 can be obtained because such additional members are omitted. Furthermore, it is possible to give a longer life to the low-pressure turbine 1 and thus the turbine engine.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A shroud segment for being incorporated in a gas turbine engine having a turbine case and a rear turbine case connected with a rear end of the turbine case so as to suppress influence of hot combustion gas on the turbine case and the rear turbine case, comprising:
   a back plate formed in an arc shape and supported by the turbine case;
   a touching member integrally formed on an inner surface of the back plate for touching with a rotating turbine blade, the touching member having an inner periphery; and
   a jet shield extended from a rear end of the back plate and slanted radially inward beyond the inner periphery of the touching member so as to shield the rear turbine case from a jet of the hot combustion gas.

2. The shroud segment of claim 1, wherein:
   the jet shield is integrally formed on the rear end of the back plate.

3. The shroud segment of claim 1, wherein:
   the touching member integrally comprises a rear touching member disposed in a rear part of the touching member and projected radially inward from the touching member.

4. The shroud segment of claim 3, wherein the touching member and the jet shield are configured so as to satisfy an inequality of 0.25m $\leq$k, where m is a radial projection length of the jet shield from the rear touching member and k is a radial projection length of the rear touching member from the touching member.

5. The shroud segment of claim 4, wherein the touching member and the jet shield are configured so as to satisfy an inequality of k$\leq$0.42m.

6. The shroud segment of claim 1, further comprising:
   a front leaf spring and a rear leaf spring attached on an outer surface of the shroud segment so as to be respectively insertable into grooves provided for the turbine case.

7. The shroud segment of claim 1, wherein a front end of the back plate is configured to support an outer band of a turbine nozzle disposed in front of and adjacent to the shroud segment.

8. The shroud segment of claim 1, wherein, on an outer surface of the back plate, a connection plate extending in a width direction thereof is provided, both ends of the connection plate are projected from the back plate so as to form a first connection piece and a second connection piece.

9. The shroud segment of claim 8, wherein the first connection piece and the second connection piece are formed in complementary shapes so that the first connection piece is engaged with and supports the second connection piece of an adjacent back plate.

10. The shroud segment of claim 1, wherein a front end of a segment flange of the shroud segment is provided with a recess in which a pin fixed to the turbine case is engaged so that a relative rotation between said shroud segment and said turbine case is prevented.

11. A shroud segment for being incorporated in a gas turbine engine having a turbine case and a rear turbine case connected with a rear end of the turbine case so as to suppress influence of hot combustion gas on the turbine case and the rear turbine case, comprising:

a back plate formed in an arc shape and supported by the turbine case;

a touching member integrally formed on an inner surface of the back plate for touching with a rotating turbine blade; and a jet shield extended from a rear end of the back plate and slanted radially inward so as to shield the rear turbine case from a jet of the hot combustion gas, wherein the touching member integrally comprised a rear touching member disposed in a rear part of the touching member and projected radially inward from the touching member, and wherein the touching member and the jet shield are configured so as to satisfy an inequality of $0.25m \leq k \leq 0.42m$, where m is a radial projection length of the jet shield from the rear touching member and k is a radial projection length of the rear touching member from the touching member.

* * * * *